United States Patent
Wang et al.

(10) Patent No.: US 7,577,678 B2
(45) Date of Patent: Aug. 18, 2009

(54) MEDIA CONTENT GENERATION METHODS AND SYSTEMS

(75) Inventors: Cheng-Feng Wang, Kaohsiung (TW); Chia-Sheng Su, Kaohsiung (TW); Sheng-Wen Bai, Pingtung County (TW)

(73) Assignee: Corel TW Corp., Taipei (TW)

( * ) Notice: Subject to any disclaimer, the term of this patent is extended or adjusted under 35 U.S.C. 154(b) by 192 days.

(21) Appl. No.: 11/638,354

(22) Filed: Dec. 14, 2006

(65) Prior Publication Data

US 2007/0192353 A1   Aug. 16, 2007

(30) Foreign Application Priority Data

Jan. 20, 2006   (TW) ............... 95102177 A

(51) Int. Cl.
*G06F 17/00*   (2006.01)

(52) U.S. Cl. .................................. 707/102; 707/104.1

(58) Field of Classification Search ........................ None
See application file for complete search history.

(56) References Cited

U.S. PATENT DOCUMENTS

| | | | | |
|---|---|---|---|---|
| 5,754,851 A | * | 5/1998 | Wissner | 707/104.1 |
| 5,959,690 A | * | 9/1999 | Toebes et al. | 348/578 |
| 6,933,432 B2 | * | 8/2005 | Shteyn et al. | 84/609 |
| 7,325,199 B1 | * | 1/2008 | Reid | 715/723 |
| 2005/0086606 A1 | * | 4/2005 | Blennerhassett et al. | 715/760 |

FOREIGN PATENT DOCUMENTS

WO   WO 01/01415 A1  *  1/2001

* cited by examiner

*Primary Examiner*—Uyen T. Le
(74) *Attorney, Agent, or Firm*—Birch, Stewart, Kolasch & Birch, LLP

(57) ABSTRACT

A playable volume generation method is provided. A playlist includes a plurality of playlist items, each targeting one of the playable items to be displayed according to the arrangement of the playlist items. A designated inter-item position on the playlist for inserting a new playlist item is received. A former playlist item and a later playlist item adjacent to the new playlist item are automatically retrieved. A second playable item targeted by the new playlist item is automatically generated to simulate a transition effect transitioning from the end of the playable item targeted by the former playlist item to the beginning of the playable item targeted by the later playlist item.

20 Claims, 7 Drawing Sheets

MEDIA CONTENT GENERATION METHODS AND SYSTEMS

BACKGROUND OF THE INVENTION

1. Field of the Invention

The present invention relates to image processing, and more particularly to multimedia content authoring and generation.

2. Description of the Related Art

A digital versatile disc (DVD) authoring application typically provides image transition editing. Digital video effects are available via dynamic video authoring applications, including transition effects which provide interesting transitions from one scene to another, such as fading or dissolving frames, wiping one frame over another, and flipping frames. Creating a transition effect between two different DVD items (such as a combination of menus, titles, or chapters) during DVD authoring requires interoperation of the two applications. For example, a video authoring application may be first utilized to create a transition video between two videos. The DVD authoring application then imports these two videos and the transition video to form DVD content.

A transition video is made based on two associated DVD items with specific playback orders thereof, thus, to embellish the scene change therebetween. Any change in menu layout or the playback order of the associated DVD items may make the original transition video unsuitable. Repeating similar editing steps to render another transition video, however, is troublesome.

BRIEF SUMMARY OF THE INVENTION

Media content generation methods and systems are provided. An exemplary embodiment of a playable content generation method comprises the following steps. A playlist comprising a plurality of playlist items is retrieved. Each playlist item corresponds to one of the playable items, and the above multiple playable items are displayed and played according to the arrangement of the playlist items. A designated inter-item position on the playlist for inserting a new playlist item is retrieved. A previous playlist item and a next playlist item adjacent to the new playlist item are automatically retrieved. A second playable item targeted by the new playlist item is automatically generated to simulate a transition effect transitioning from the end of the playable item targeted by the previous playlist item to the beginning of the playable item targeted by the next playlist item.

The method can be implemented with a computer application recorded in a storage medium, such as a memory or a memory device. When the computer application is loaded into a computer, it directs the computer to execute the described method.

A playable media content generation system comprises an authoring tool and an effect generator. The authoring tool retrieves a playlist, and the playlist comprises a plurality of playlist items. Each item corresponds to one of the playable items. The above multiple playable items can be displayed and played according to the arrangement of the playlist items. An inter-item position on the playlist is designated for inserting a new playlist item. The effect generator automatically retrieves a previous playlist item and a next playlist item adjacent to the new playlist item, and generates a second playable item simulating a transition effect transitioning from the end of the playable item targeted by the previous playlist item to the beginning of the playable item targeted by the next playlist item. The authoring tool automatically adjusts the new playlist item for corresponding to the second playable item.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The playable media content generation method may be implemented by a computer program executed in a computing device, such as a personal computer, or a notebook computer for example.

Figure 1:
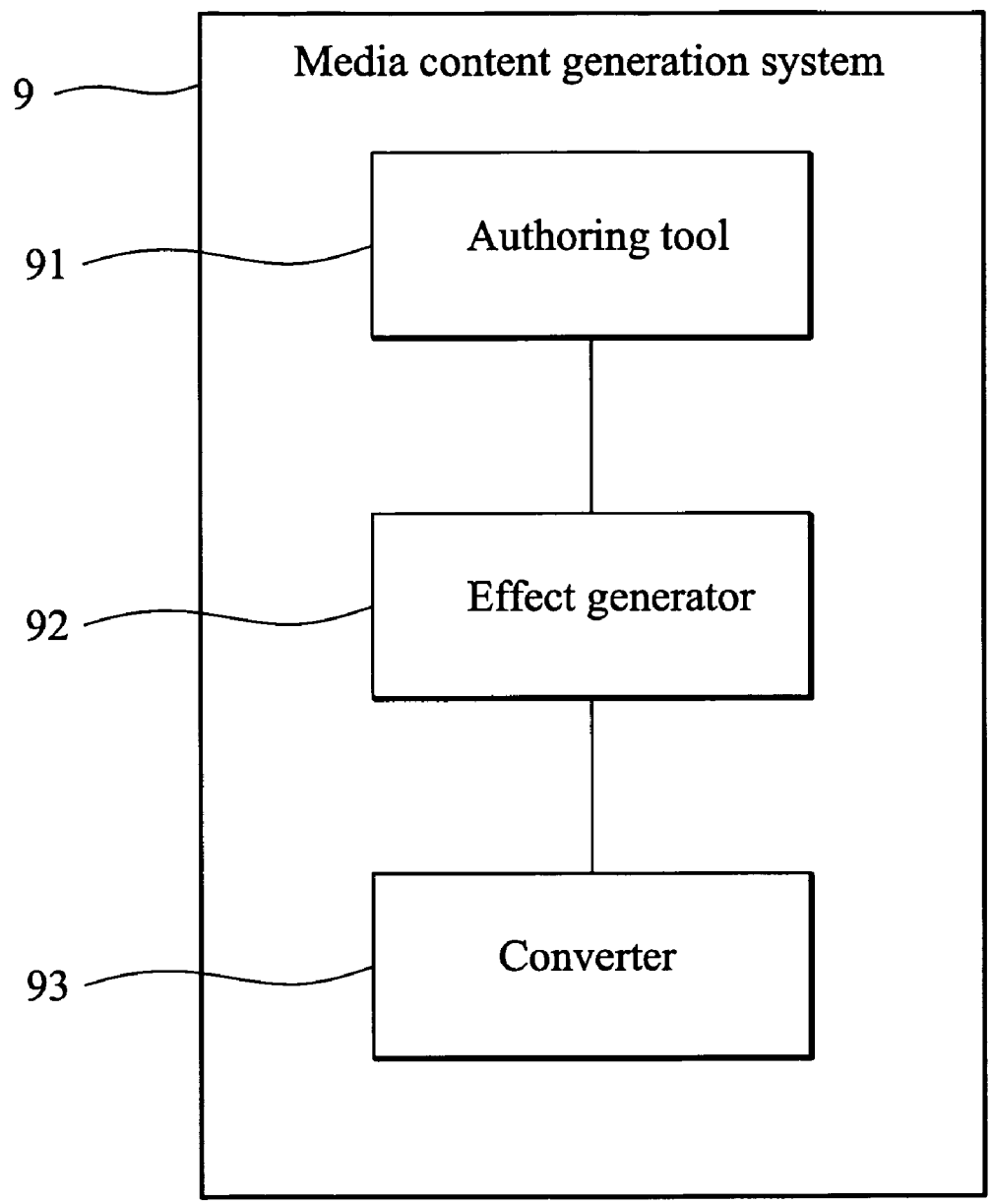
FIG. 1 is a block diagram of an exemplary embodiment showing a media content generation system.

In FIG. 1, media content generation system 9 comprises an authoring tool 91, an effect generator 92, and a converter 93. Authoring tool 91 provides functions for authoring multimedia data to be stored in a storage medium (such as a disc, a floppy disk, a hard disk, or a flash memory), referred to as playable content. For example, playable content comprises disc content conforming to the DVD, video compact disc (VCD), Blu-ray, advanced optical disc (AOD), enhanced versatile disc (EVD), or high-definition DVD (HDDVD) specification. A playable content comprises multiple playable items and a playlist defining the order in which the playable items are navigated. A playable item may comprise a navigation menu, a title, or a chapter. A menu may comprise background, text, scene button, other button, and other as yet developed control elements assisting content navigation. A title, such as a DVD title, may comprise video, audio, and navigation commands. A chapter as part of a title may also comprise video, audio, and navigation commands. A chapter may be implemented by a part-of-title (PTT) in the DVD specification or by a selected item in the VCD specification. A playlist comprises a plurality of playlist items, and each item corresponds to a playable item. A playlist may be implemented by a program chain (PGC) in the DVD specification or by a selected list in VCD specification. A playlist item may be implemented by a program and DVD commands in DVD specification or by a selected list in the VCD specification.

Authoring tool 91 retrieves and organizes playable items to form a playable content. Effect generator 92 automatically generates a new playable item to form a portion of the playable content and to simulate a transition effect between two existing playable items therein. Converter 93 transforms the playable content to conform to a format, and output the playable content to a storage medium such as DVD, VCD, AOD, EVD, or HDDVD disc, or others.

Figure 2:
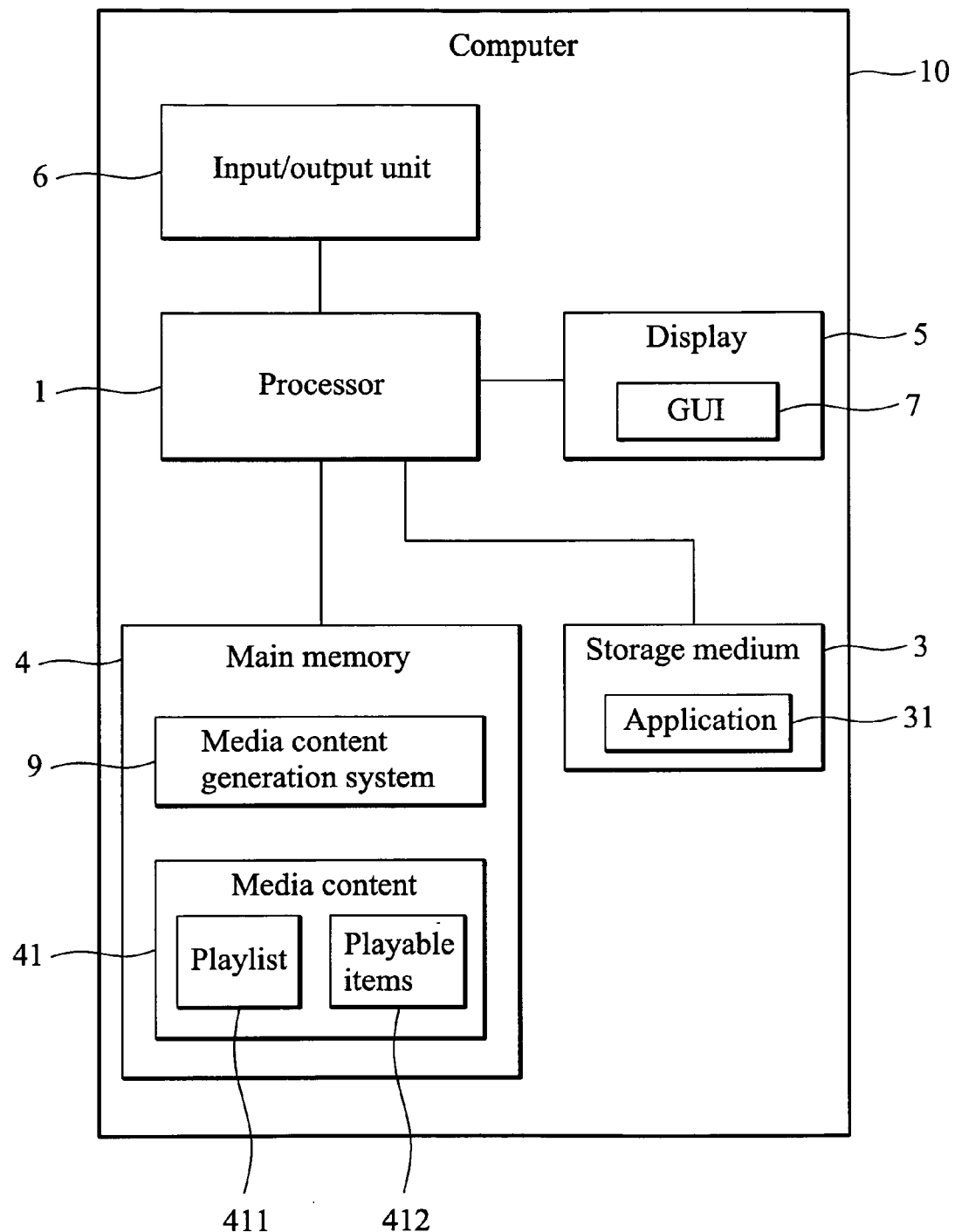
FIG. 2 is a schematic view showing a computer implemented with the media content generation system.

Computer 10 in FIG. 2 comprises a processor 1 for processing data, a non-volatile storage medium 3 and a main memory 4 for storing data, a display 5 for displaying a user interface, and an input/output unit 6 for data input and output. Processor 1 couples to storage medium 3, memory 4, display 5, and input/output unit 6. Memory 4 comprises content generation system 9. Input/output unit 6 may comprise a mouse, a keyboard, a disc drive, and a disc recorder.

Media content generation system 9 may be implemented in a media content authoring application 31 stored in a storage medium 3, such as a hard disk, a flash disk, or a compact disc. When application 31, is loaded to main memory 4 by processor 1, it directs computer 10 to perform a media content generation method.

Figure 3:
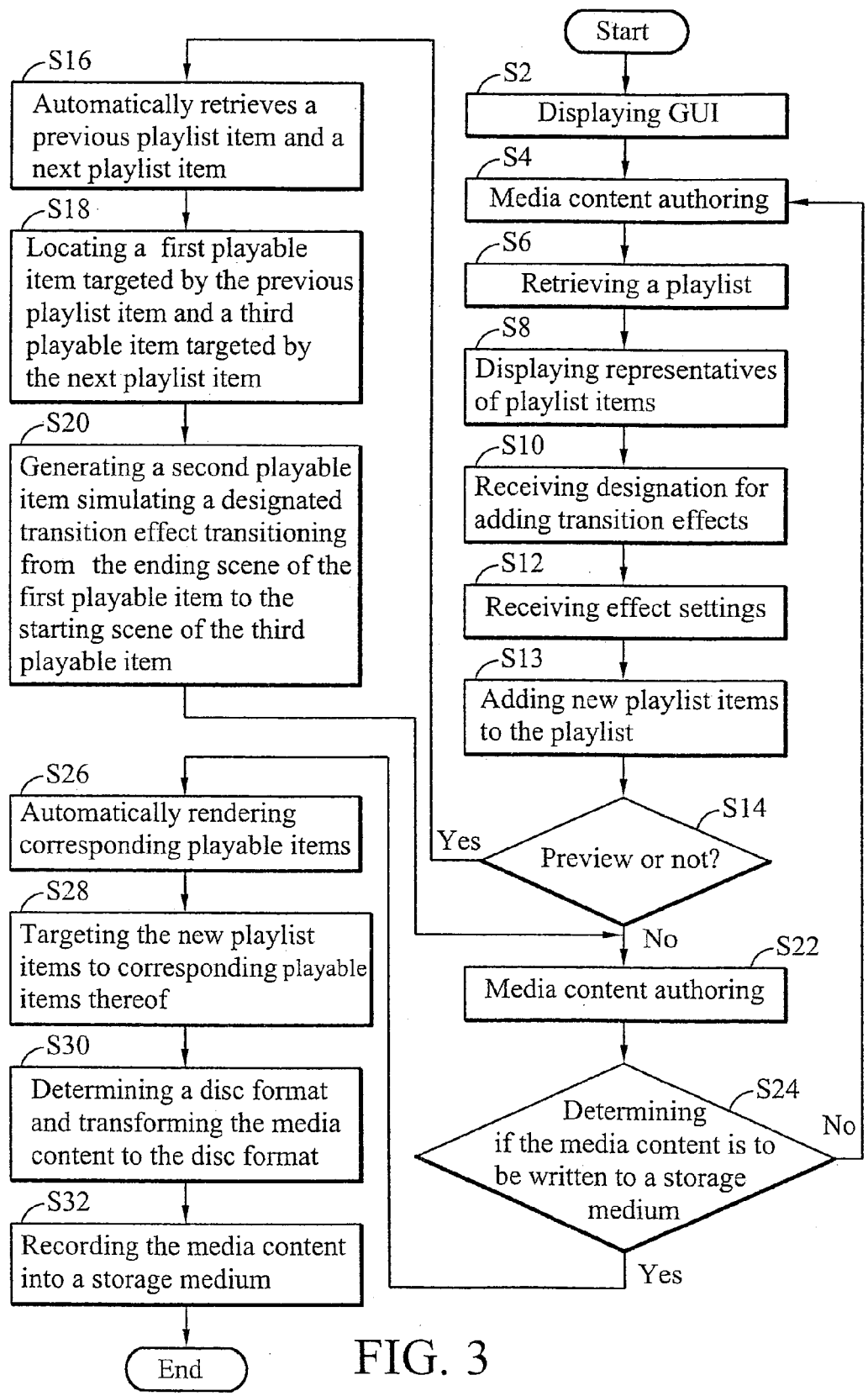
FIG. 3 is a flowchart of an exemplary embodiment showing a media content generation method.

A playable content generation method is detailed in the following with reference to FIG. 3.

Figure 4:
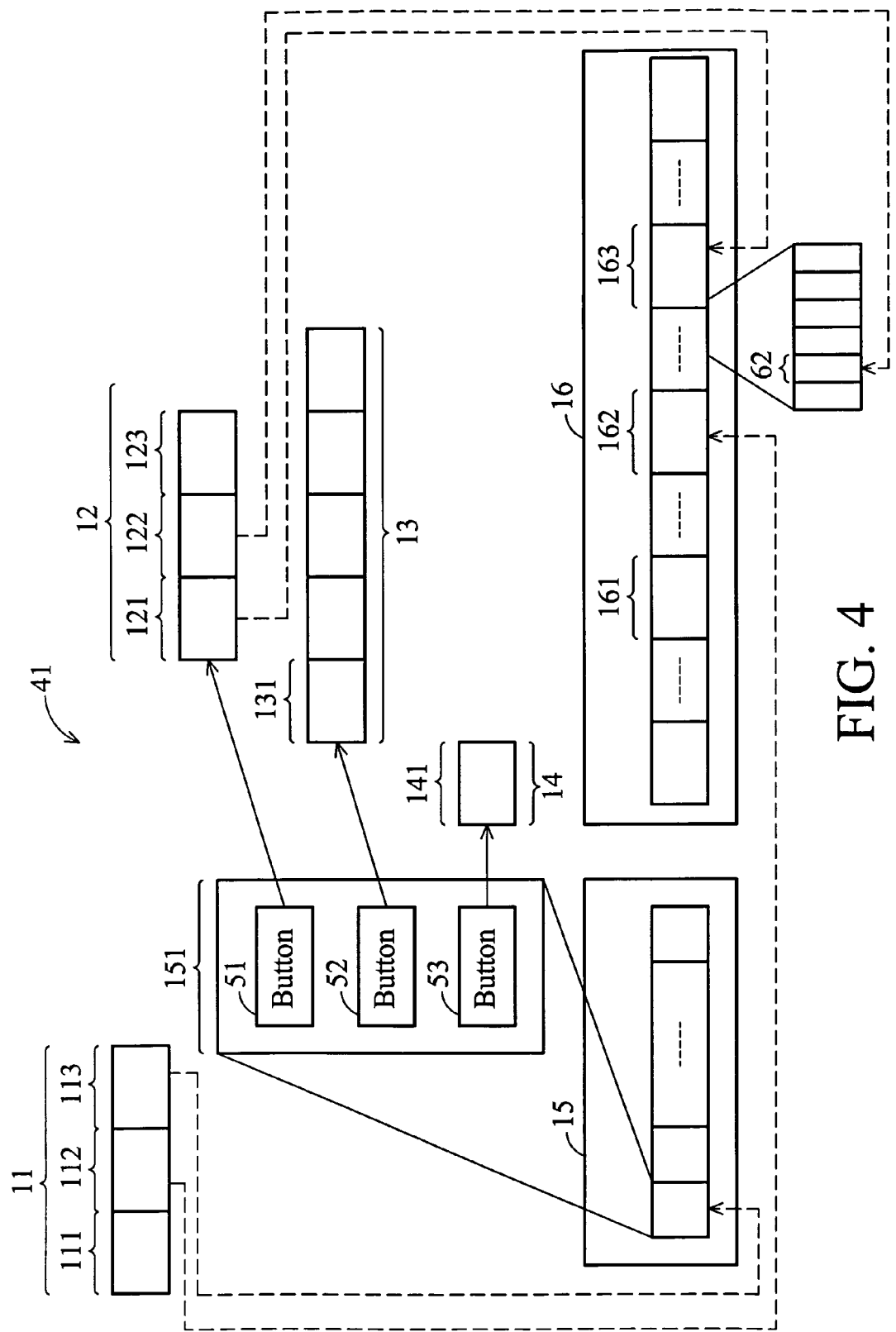
FIG. 4 is a schematic view of an example showing a playlist.

Authoring tool 91 displays content authoring graphical user interface (GUI) 7 on display 5 (step S2) and generates media content 41 by importing media data, authoring media data and menus according to operation on input/output unit 6 (step S4). Authoring tool 91 retrieves playlist 411 (in FIG. 2) of media content 41 (step S6) and displays representative GUIs thereof on display 5 (step S8). Playlist 411 comprises a plurality of playlist items, and each item corresponds to one of the playable items 412 for further display according to the arrangement of the playlist items. Authoring tool 91 may only display a portion of the playlist items represented by the GUI. FIG. 4 shows a schematic view of an example of playlist 411.

In FIG. 4, playlist 411 comprises playlists 11, 12, 13, and 14. Playable items 412 comprise menu set 15 and title set 16. The arrangement of playlist items defines the playback order of their corresponding targets (i.e. playable items). When media content 41 is played by a player, the corresponding target of a playlist item (i.e. a playable item) is displayed by the player prior to the corresponding target of its right neighbor's playlist item. Playlist 11 is the first play playlist of media content 41. Thus, the playable item targeted by a playlist item 111 is to be displayed first. Playlist items 112 and 113 respectively correspond to title 161 and menu 151, and the menu 151 comprises buttons 51, 52, and 53. Buttons 51, 52, and 53 are respectively defined to trigger presentation of playable items targeted by playlists 12, 13, and 14. When button 51 is selected by a player, title 163 targeted by playlist item 121 is then displayed by the player, followed by the display of chapter 62 targeted by playlist item 122. Chapter 62 comprises one of a plurality of chapters of title 162. Similarly, when selecting button 52 or 53, the player accordingly displays the playable item targeted by playlist item 131 or 141.

Figure 5:
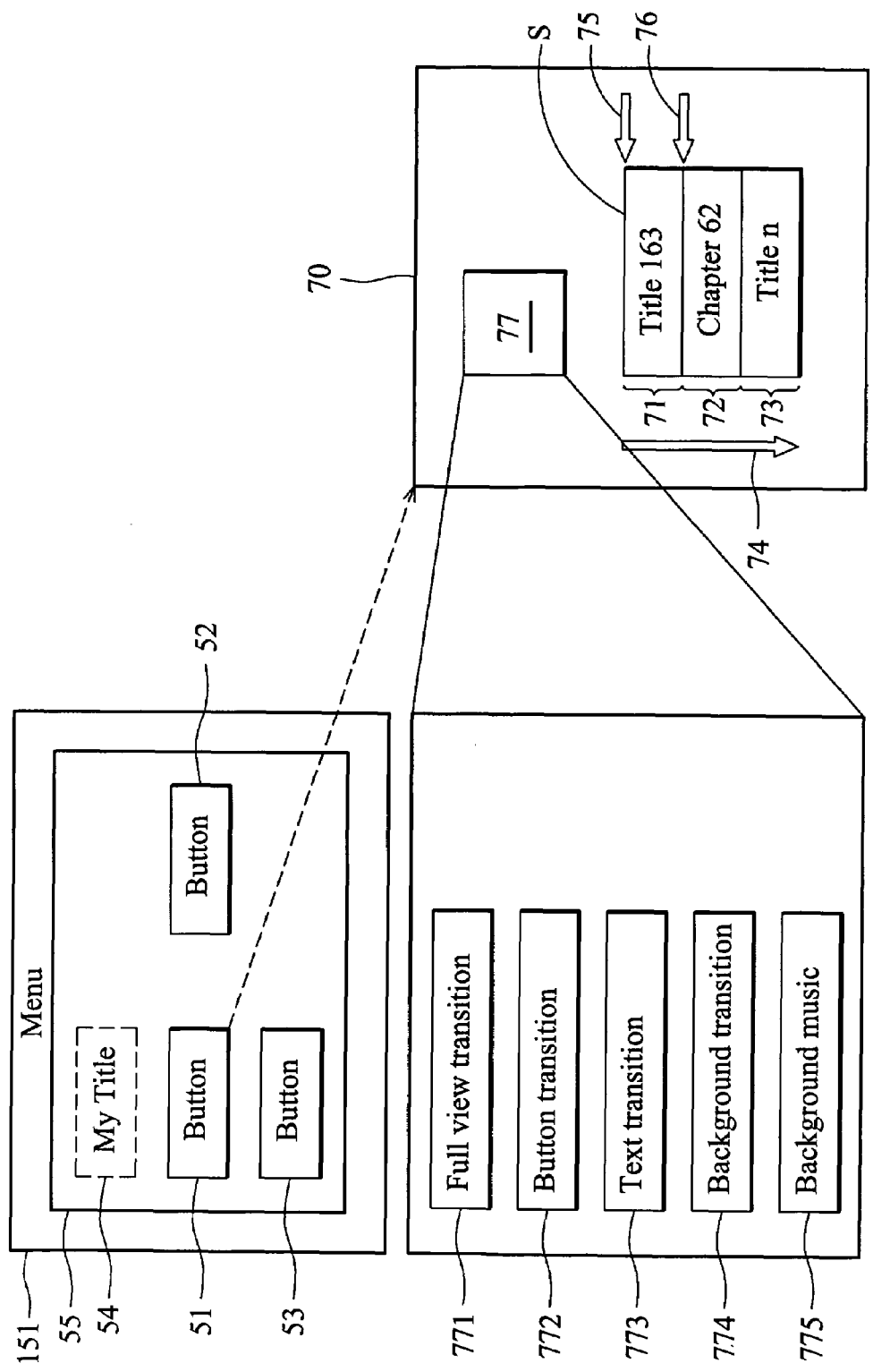
FIG. 5 is a schematic diagram of an exemplary graphical user interface (GUI) for transition effect authoring.

In step S8, authoring tool 91 may display a portion of the playlist items represented by the GUI on display 5. With reference to FIG. 5, interface 7 may comprise window 70 associated with menu 151. When menu 151 is being edited and displayed on display 5, window 70 is provided to assist button design. For example, window 70 appears when button 51 is focused in application 31, wherein blocks 71, 72, and 73 arranged in stack S respectively represent playlist items 121, 122, and 123. Authoring tool 91 provides each block with text thereon denoting the name of a corresponding playable item thereof, which is targeted by a corresponding playlist item represented by the block. Stack S denotes a sequence of items to be played when button 51 is selected by a player, and arrow 74 denotes the playback order thereof. Authoring tool 91 receives requests from input/output unit 6 for inserting transition effects into the playback sequence. The requests comprise information of the types of the transition effects and the positions for insertion of the transition effects.

Figure 6:
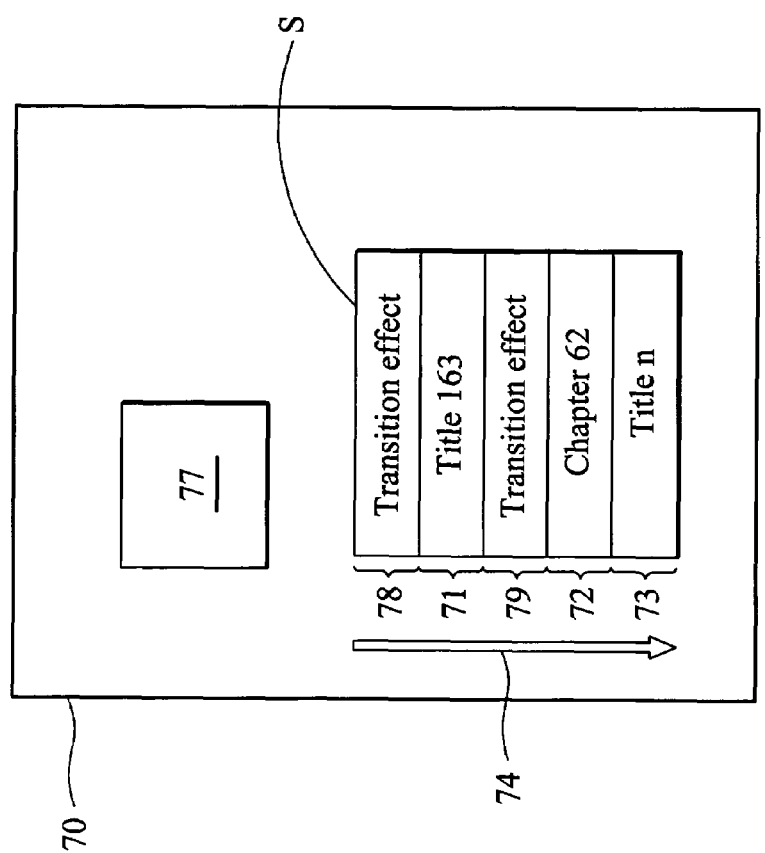
FIG. 6 is an exemplary GUI window with representatives of new playlist items.

Authoring tool 91 receives designated inter-item positions on playlist 41 for inserting playlist items with transition effects (step S10) and receives settings of the transition effects (step S12). For example, with reference to FIG. 4, the positions between playlist items 112 and 113, 113 and 121, 113 and 131, 113 and 141, and the position between playlist items 121 and 122 are designated for inserting playlist items with transition effects. Regarding playlist 12, pointers 75 and 76 in FIG. 5 denote the positions to add transition effects, respectively corresponding to the position between playlist items 113 and 121 and the position between playlist items 121 and 122. GUI 77 comprises GUI elements for configuring types and attributes of the transition effects. For example, GUI 77 may comprise GUI elements 771 for full view transition settings, 772 for button transition settings, 773 for text transition settings, 774 for menu background transition settings, and 775 for background music settings. Each of the GUI elements 771-775 may comprise options of effects type and attributes. Buttons 51-53, text 54, and background image 55 may be respectively assigned different transition effects via GUI 77. FIG. 6 shows the window 70 with new blocks 78 and 79 representative of new playlist items with transition effects. Note that as stack S is modified, the playback sequence to be activated by button 51 is also changed. Authoring tool 91 adds new playlist items to playlist 41 according to the designation and the setting (step S13). With reference FIG. 7, new playlist items 124 and 125 corresponding to blocks 78 and 79 are added to playlist 12. Playlist items 114, 132, and 142 are respectively added to playlist 11, 13, and 14.

Authoring tool 91 determines if any new playlist item (such as playlist items 114, 124, 125,132, or 142 in FIG. 7) is selected for transition effect preview (step S14). When authoring tool 91 receives a request for previewing a transition effect corresponding to a new playlist item (such as playlist item 124), effect generator 92 automatically retrieves a previous playlist item (such as playlist item 113) and a next playlist item (such as playlist item 121) adjacent to the new playlist item (such as playlist item 124) (step S16), locates the playable item (such as menu 151) targeted by the previous playlist item (such as playlist item 113) and the playable item (such as title 163) targeted by the next playlist item (such as playlist item 121) (step S18), generates and displays a second playable item simulating a designated transition effect beginning from the ending scene of the first playable item (such as menu 151) to the starting scene of the third playable item (such as title 163) (step S20).

The corresponding transition effects of the selected playlist items are rendered based on the targets of the front and next playlist items thereof. If the first and the third playable items are video clips (such as titles, chapters, or combination thereof), the last frame of the first playable item and the first frame of the third playable item may be utilized to generate the transition effect. If one of the first and the third playable items is a menu, the full view or respective layers (such as buttons, text, and the background image) of the menu may be utilized to generate the transition effect. Buttons, text, and the background image of the menu may have different transition effects according to respective settings determined in the step S12. Thus, effect generator 92 may generate transition effects from a menu to a menu, a menu to a title, a menu to a chapter, a title to a menu, a title to a title, a title to a chapter, a chapter to a menu, a chapter to a title, and a chapter to a chapter in step S20.

Authoring tool 91 may further modify media content 41, comprising adjusting settings of the previewed transition effect, adding, deleting, or moving playlist items (step S22). Authoring tool 91 determines if media content 41 is to be written to a storage medium (step S24). If not, step S4 may be repeated. If so, for each new playlist item (such as playlist items 114, 124, 125, 132, or 142 in FIG. 7), effect generator 92 automatically renders a corresponding playable item simulating a transition effect according to the settings thereof, transitioning from the ending scene of a playable item targeted by its previous playlist item to the beginning scene of another playable item targeted by its next playlist item (step S26). Even if the neighbors (first and next playlist items) of a new playlist item are replaced in step S22, effect generator 92 automatically generates a corresponding playable item based on the new neighbors of the new playlist item in step S26. The detailed procedure of playable item generation in step S26 is similar to steps S16-S20. Effect generator 92 automatically retrieves a previous playlist item (such as playlist item 121) and a next playlist item (such as playlist item 122) adjacent to the new playlist item (such as playlist item 125), locates the playable item (such as title 163) targeted by the previous playlist item (such as playlist item 121) and third playable item (such as chapter 62) targeted by the next playlist item (such as playlist item 122), generates and displays a second playable item simulating a designated transition effect beginning from the ending scene of the first playable item (such as title 163) to the starting scene of the third playable item (such as chapter 62).

Figure 7:
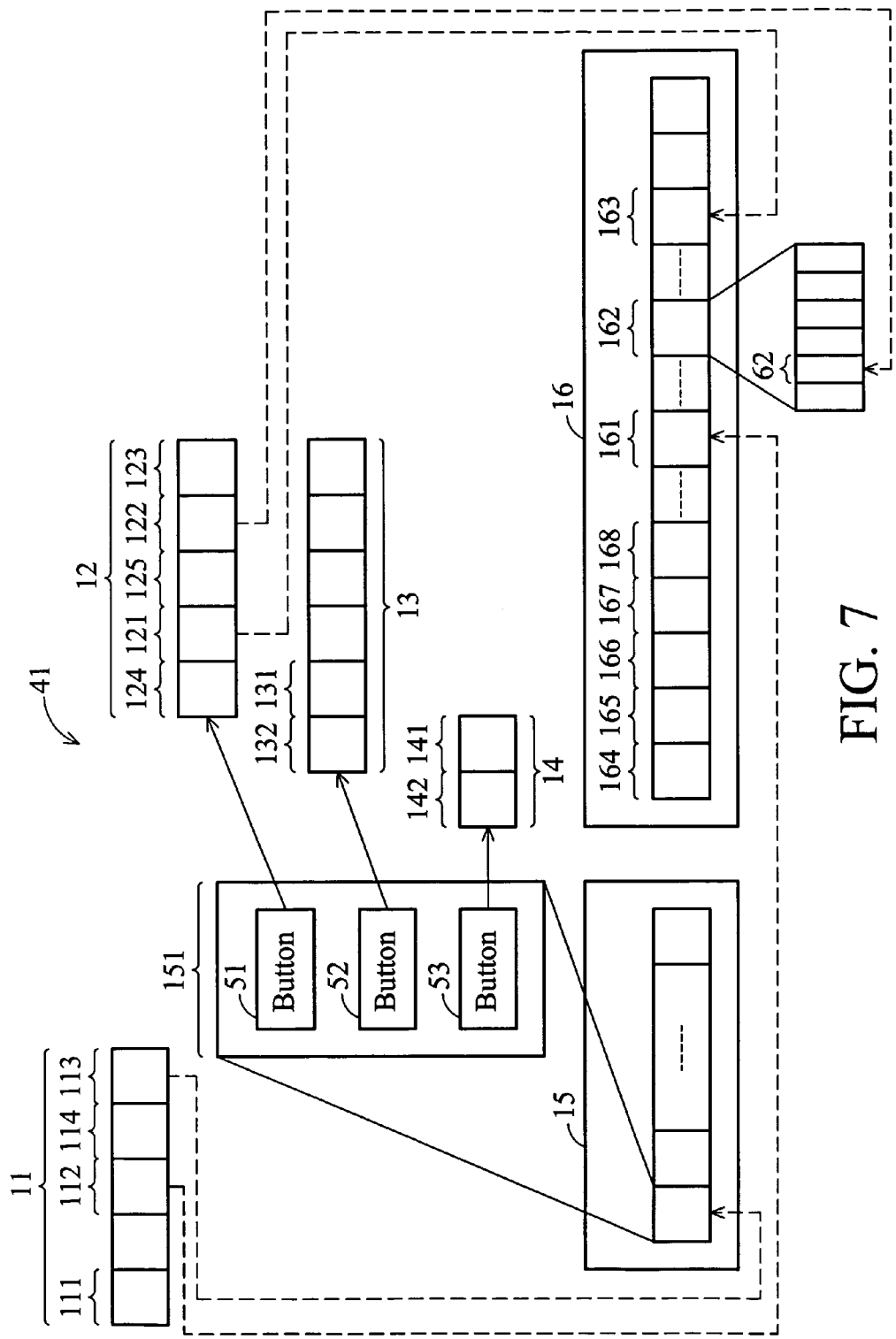
FIG. 7 is a schematic view of the playlist with a new playlist item.

In FIG. 7, titles 164-168 respectively correspond to playlist items 114, 124, 125, 132, and 142. Title 164 is generated based on title 161 (targeted by playlist item 112) and menu 151 (targeted by playlist item 113) to simulate a transition effect transitioning from title 161 to menu 151. Similarly, title 165 is generated based on menu 151 and title 163 respectively targeted by playlist item 113 and 121. Title 166 is generated based on title 163 and chapter 62 respectively targeted by playlist item 121 and 122. Title 167 is generated based on menu 151 and a playable item respectively targeted by playlist item 113 and 131. Title 168 is generated based on menu 151 and a playable item respectively targeted by playlist item 113 and 141.

Authoring tool 91 makes the new playlist items target corresponding playable items thereof (step S28). Playlist items 114, 124, 125, 132, and 142 in FIG. 7 respectively target to titles 164-168. Converter 93 determines a disc format and transforms the media content to the disc format, such as DVD, VCD, Blu-ray, AOD, HDDVD, EVD, or other media format. (step S30), and records media content 41 into a storage medium through input/output unit 6 (step S32). For example, the input/output unit 6 is a disc recording device writing the generated media content into a disc conforming to VCD, DVD, Blu-ray, AOD, HDDVD, EVD, or other media formats.

When media content 41 is played by a player, the playable items are displayed according to playlist 411 and user operations. For example, presentation of menu 151 by a player is terminated when button 51 thereon is selected, followed by presentation of title 165, 163, 166, chapter 62, and a playable item targeted by playlist item 123 in series according to the arrangement of playlist 411.

In conclusion, authoring tool 91 retrieves and organizes playable items to form a playable content, and receives a designation for insertion of a transition effect between future presentations of two successively displayed playable items therein, referred to as a first video and a third video. Effect generator 92 automatically generates a second playable item to form a portion of the playable content based on these two playable items and a transition effect selected from a plurality of effects provided by authoring tool 91. Converter 93 transforms the playable content to conform to a format, and output the playable media content to a storage medium so that, when the playable media content is being displayed, the second and the third playable items are displayed in series following the end of the display of the first playable item.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A playable media content generation method, comprising:
    receiving a playlist having a plurality of playlist items, each one of said plurality of playlist items corresponding to each one of a plurality of playable items and each one of the playable items being displayed according to arrangement of the playlist items;
    receiving a designation to an inter-item position on the playlist;
    inserting a new playlist item into said playlist according to said designation;
    automatically retrieving a previous playlist item and a next playlist item adjacent to the new playlist item;
    automatically generating a second playable item simulating a transition effect transitioning from the end of a first playable item targeted by the previous playlist item to the beginning of a third playable item targeted by the next playlist item;
    displaying said second playable item simulating said transition effect transitioning from the end of said first playable item targeted by the previous playlist item to the beginning of said third playable item targeted by the next playlist item; and
    automatically targeting the new playlist item to the second playable item.

2. The method as claimed in claim 1, wherein the first and the third playable items respectively comprise an instance of a title, a chapter, or a menu.

3. The method as claimed in claim 2, wherein the first playable item comprises a menu with a button thereon for activating presentation of the third playable item, further comprising, after targeting the new playlist item to the second playable item, making the button activate presentation of the second playable item, followed by presentation of the third playable item according to the arrangement of the new playlist item in the playlist.

4. The method as claimed in claim 1, wherein the retrieving, generating, and inserting steps are executed when the playlist and the playable items are to be recorded on a storage medium.

5. The method as claimed in claim 4, wherein the storage medium conforms to digital versatile disc/disk (DVD), video compact disc (VCD), Blu-ray, advanced optical disc (AOD), enhanced versatile disc (EVD), or high-definition DVD (HD-DVD) specifications.

6. The method as claimed in claim 4, wherein the method is implemented in a single media content authoring application, further comprising recording the playlist and the playable items on the storage medium such that, when the storage medium is played, the second and third playable items are displayed in series following the end of the display of the first playable item.

7. The method as claimed in claim 1, further comprising:
when the previous playlist item or the next playlist item are replaced, automatically generating a new playable item accordingly; and
automatically targeting the new playlist item to the new playable item.

8. The method as claimed in claim 1, further comprising providing multiple user interfaces for assigning the type and attributes of the transition effect.

9. The method as claimed in claim 1, wherein at least one of the first and the third playable items comprises a menu, further comprising providing user interfaces for assigning respective transition effects to be applied on different layers of the menu.

10. The method as claimed in claim 9, wherein the layers of the menu comprises texts, buttons, and a background.

11. A machine-readable storage medium storing a computer program which, when executed, directs a computer to perform a media content generation method as claimed in claim 1.

12. A playable media content generation system, comprising:
an authoring tool retrieving a playlist comprising a plurality of playlist items, each targeting one of the playable items to be displayed according to arrangement of the playlist items, receiving a designation to an inter-item position on the playlist and inserting a new playlist item into said playlist according to said designation;
an effect generator automatically retrieving a previous playlist item and a next playlist item adjacent to the new playlist item, and generating a second playable item simulating a transition effect transitioning from the end of a first playable item targeted by the previous playlist item to the beginning of a third playable item targeted by the next playlist item, wherein the authoring tool targets the new playlist item to the second playable item; and
a display displaying said second playable item simulating said transition effect transitioning from the end of said first playable item targeted by the previous playlist item to the beginning of said third playable item targeted by the next playlist item,
wherein said playable media content generation system is embedded in a memory of a computer, and operations of said authoring tool and said effect generator are executed by the computer.

13. The system as claimed in claim 12, wherein the first and the second playable items respectively comprise an instance of a title, a chapter, or a menu.

14. The system as claimed in claim 13, wherein the first playable item comprises a menu with a button thereon for activating presentation of the third playable item, after the new playlist item has targeted to the second playable item, the effect authoring tool makes the button activate presentation of the second playable item, followed by presentation of the third playable item according to the arrangement of the new playlist item in the playlist.

15. The system as claimed in claim 12, wherein the effect generator automatically generates the second playable item when the playlist and the playable items are to be recorded on a storage medium.

16. The system as claimed in claim 15, wherein the storage medium conforms to specifications of digital versatile disc/ disk (DVD), video compact disc (VCD), Blu-ray, advanced optical disc (AOD), enhanced versatile disc (EVD), or high-definition DVD (HDDVD).

17. The system as claimed in claim 15, wherein the system comprises a single media content authoring application recording the playlist and the playable items on the storage medium such that, when the storage medium is played, the second and third playable items are displayed in series following the end of the display of the first playable item.

18. The system as claimed in claim 12, wherein when the previous playlist item or the next playlist item is replaced, the effect generator automatically generates a new playable item accordingly, and the authoring tool targets the new playlist item to the new playable item.

19. The system as claimed in claim 12, wherein the authoring tool further provides user interfaces for assigning the type and attributes of the transition effect.

20. The system as claimed in claim 12, wherein at least one of the first and the third playable items comprises a menu, the authoring tool further provides user interfaces for assigning transition effects to be respectively applied on different layers of the menu, wherein the layers of the menu comprises text, buttons, and a background.

* * * * *